UNITED STATES PATENT OFFICE.

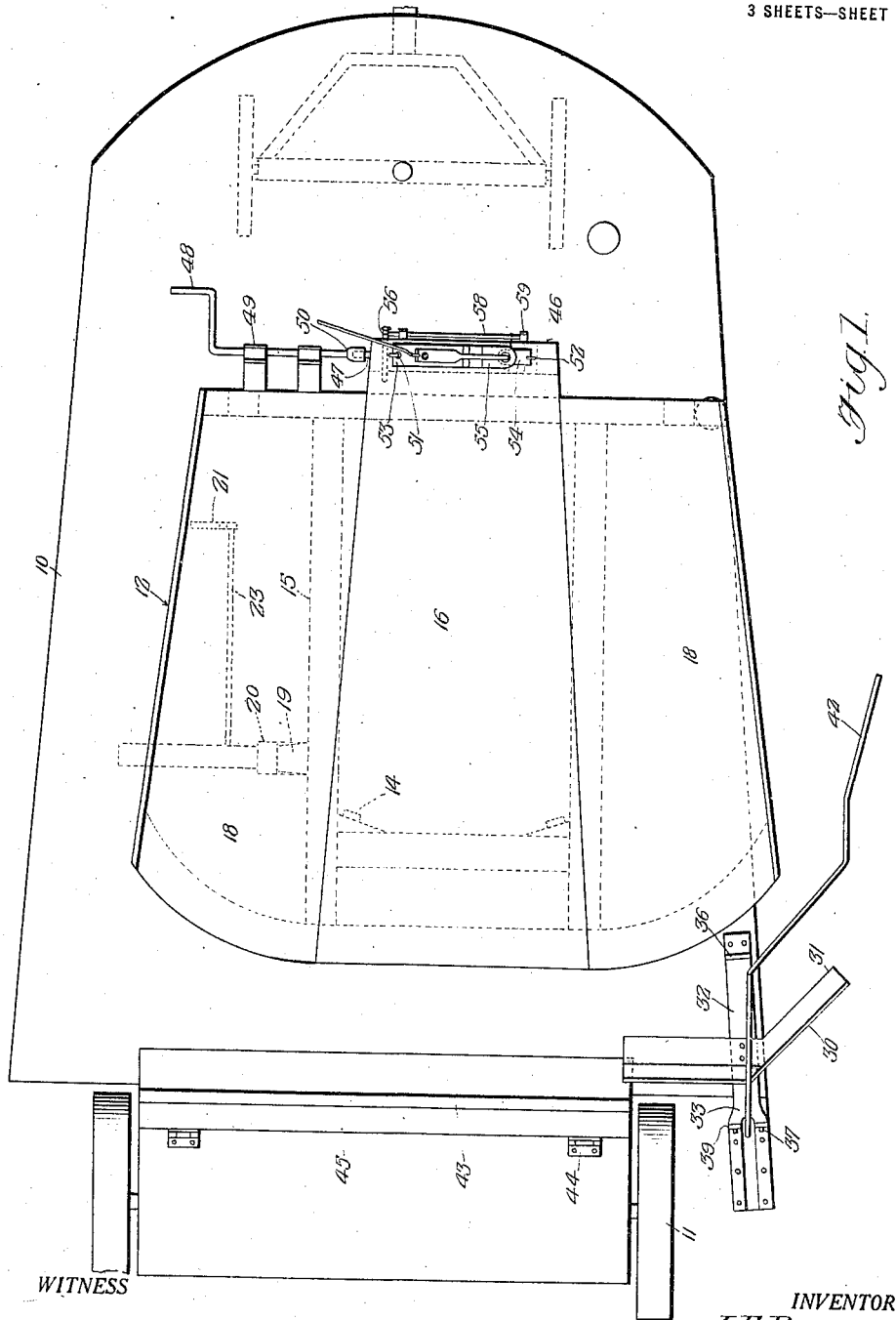

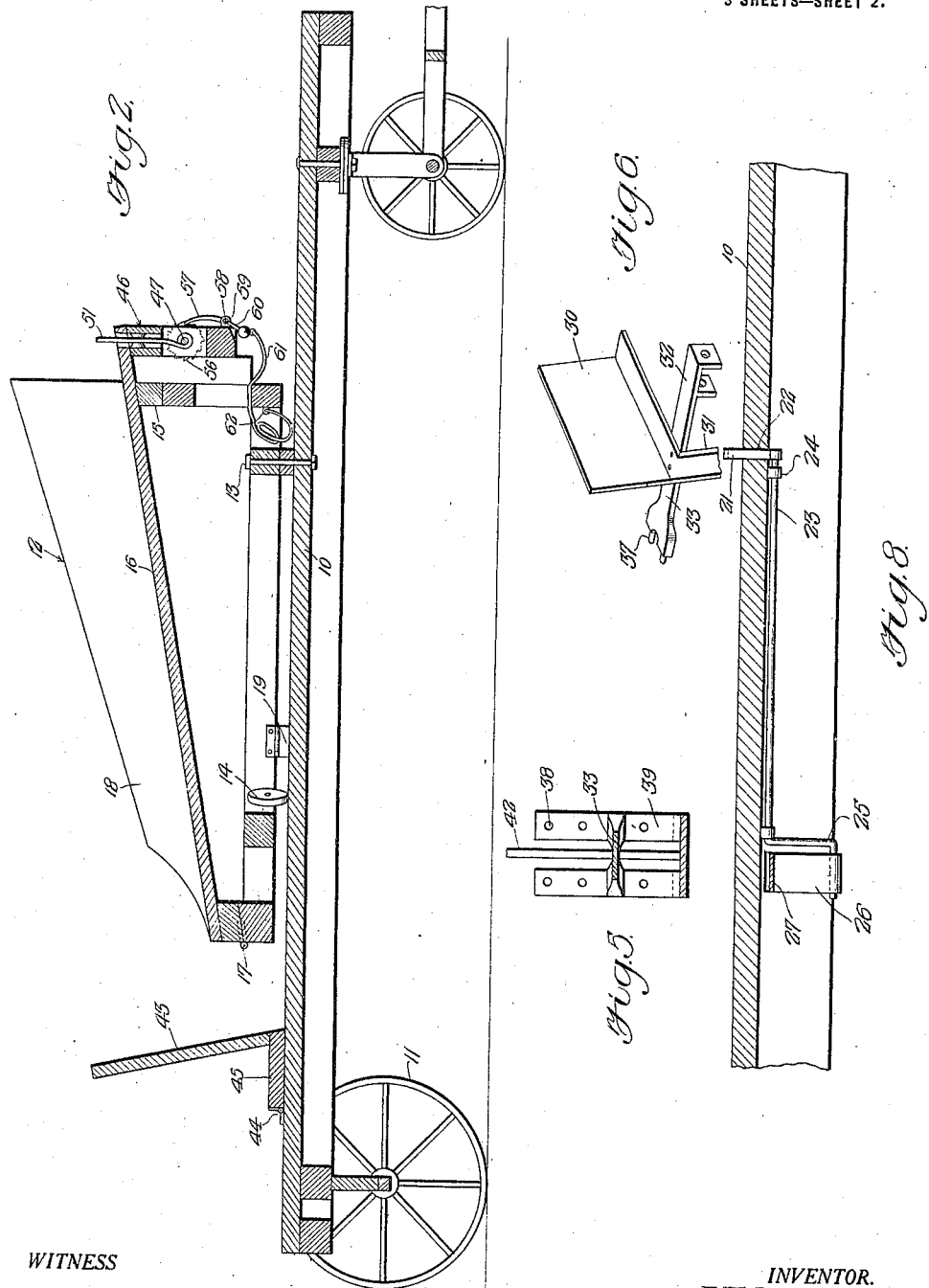

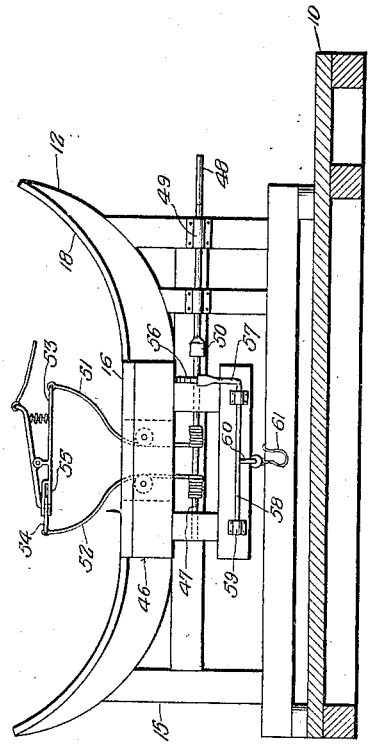

JOHN E. REECE, OF BUTLER, TENNESSEE, ASSIGNOR, BY DIRECT AND MESNE ASSIGNMENTS, OF ONE-THIRD TO ASA C. REECE, AND ONE-THIRD TO W. J. PIERCE ADMINISTRATOR OF D. J. FARTHING, DECEASED, BOTH OF BUTLER, TENNESSEE.

CORN-HARVESTER.

1,320,917.   Specification of Letters Patent.   Patented Nov. 4, 1919.

Application filed March 14, 1919. Serial No. 282,536.

*To all whom it may concern:*

Be it known that I, JOHN E. REECE, a citizen of the United States, residing at Butler, in the county of Johnson and State of Tennessee, have invented new and useful Improvements in Corn-Harvesters, of which the following is a specification.

This invention relates to corn harvesters and aims to provide a machine in which is combined a cutting mechanism and a shocking mechanism, by means of which corn may be cut and shocked and arranged in rows with a minimum of time and labor.

The object of the invention is the provision of a novel form of shocking trough, which is rotatably mounted upon a wheel supported platform and held in position by means of a novel form of latch which automatically acts to hold the trough in position to receive the stalks, but which may be manually released for the purpose of rotating the trough to dumping position, the trough including a hinged dumping section, which is operable to deposit the shock in upright position at one side of the platform.

Another object of the invention resides in the provision of means for arranging the stalks in shocks and holding them by means of a temporary binder, which binder is automatically released as the shock is dumped upon the ground.

A further object is the provision of a butting board which is located at and spaced from one end of the shocking trough, so as to provide an even butt for the shock to enable the latter to maintain a proper upright position after it has been deposited on the ground.

A still further object is the provision of novel means for adjusting the knife so as to regulate the height or angle at which the stalk is cut.

Other objects and advantages of the invention will appear as the following description is read in connection with the accompanying drawings.

In the drawings:

Figure 1 is a plan view of a corn harvester embodying the present invention.

Fig. 2 is a central vertical longitudinal sectional view of the same.

Fig. 3 is a transverse sectional view looking at the end of the shocking trough.

Fig. 4 is an enlarged fragmentary elevation showing the knife and the guide bar.

Fig. 5 is a detail sectional view on the line 5—5 of Fig. 4.

Fig. 6 is a detail perspective view of the knife.

Fig. 7 is a fragmentary sectional view showing the shock trough locking mechanism.

Fig. 8 is a similar view taken at right angles to Fig. 7.

Referring to the drawings in detail wherein like characters of reference denote corresponding parts, the invention includes a frame 10, which is suitably supported upon wheels 11. Mounted upon the platform is a shocking trough 12, the latter being inclined and capable of rotation with respect to the platform upon a bolt 13. The bolt is located at one end of the trough 12. The opposite end of the said trough is supported upon rollers 14. The trough comprises a frame 15, upon which is mounted a central dumping section 16, the latter being hinged at one end, as shown at 17. Carried by the frame 15 and positioned at each side of the dumping section 16 are upwardly curved sides 18, so that when the stalks are deposited within the trough they will gravitate toward the center and rest upon the section 16.

The trough is normally disposed longitudinally of the platform and is held in such position through the medium of a hinged gravity latch 19, which is carried by the frame 15 and is adapted to engage a keeper 20 mounted upon the platform in the path of the latch. For the purpose of releasing the latch 19 there is provided a trip 21 which extends through an opening 22 in the platform 10 and is connected to or formed upon one end of a rock shaft 23, the latter being mounted in suitable bearings 24, located beneath the platform. The opposite end of the rock shaft 23 is provided with a crank arm 25, which engages a laterally extending loop 26 formed in or secured to the intermediate portion of a lift bar 27. The bar 27 is capable of longitudinal sliding movement and is provided with an upwardly extending extremity 28, which passes through an opening 29 provided in the platform 10 and engages the underside of the latch 19.

When it is desired to release the shocking trough for the purpose of moving the same upon its pivot, the trip 21 is depressed to rock the shaft 23 and impart a longitudinal sliding movement to the bar 27, which movement lifts the latch 19 a sufficient distance to avoid the keeper 20.

Carried by the platform 10 and projecting beyond one side thereof, is a knife 30, the cutting edge 31 of which extends downwardly and outwardly for engagement with the stalks to provide a shearing cut. This knife is provided with oppositely extending prongs 32 and 33, the former carrying a spring actuated latch 34, which is adapted to engage one of a plurality of openings 35 provided in a standard 36, mounted upon the platform 10. The arm 33 is bifurcated to form fingers 37, each of which is adapted to engage openings 38 formed in parallel brackets 39, also secured to the platform. The standards 36 extend through an opening 40 in the said platform and are adjustably secured to a downwardly extending bracket 41. By this means the height of the knife 30 may be regulated.

In order to guide the stalks against the cutting edge of the knife 30, there is provided a guide bar 42, which projects outwardly beyond the side of the platform 10 above the knife and in advance of the latter. This guide bar extends inwardly over the platform and within the adjacent edge of the shocking trough, so that the stalk is guided by the bar 42 inward over the trough and against the cutting edge of the knife 30. After the stalk is cut it will fall inward upon the curved sections 18 of the shocking trough and will gravitate downward upon the central or dumping section 16. The guide bar 42 is formed of spring metal and preferably extends downward between the brackets 39 where it is secured to the platform.

In the use of the invention, an attendant stands upon the platform and aids in arranging the stalks upon the center of the shocking trough with the cutting ends thereof abutting against the butting board 43, which is hingedly mounted upon the platform, as shown at 44, the said hinges being connected to the board 43 through the medium of an angular extension 45. The bottom of the shocking trough 12 is disposed at an inclination and the butting board is also inclined to a position substantially at right angles to the bottom of the trough. The butting board 43 is arranged transversely of and spaced from the lower end of the trough 12, so that the stalks will be directed downward toward the board 43 to facilitate the arrangement of the shocks. The free end of the dumping section 16 of the trough 12 carries a downwardly extending frame 46, in which there is mounted for rotation a shaft or drum 47, the latter being rotated through the medium of a crank 48, which is slidably mounted in bearings 49 carried by the frame 15 and has a sliding engagement with the projecting end of the shaft 47, as shown at 50. Secured to the shaft 47 are two cables 51 and 52, the former carrying a spring actuated hook member 53 and the latter an apertured blade 54, which is adapted to be received within the bifurcated end 55 of the hook member, so as to secure the ends of the cables 51 and 52 together. These cables are normally separated and when a sufficient number of stalks have been cut to provide a shock, the cables 51 and 52 are connected around the stalks and the shaft 47 is rotated to bundle the stalks into shock formation.

Mounted fast upon the shaft 47 is a ratchet wheel 56 which is engaged by a dog 57, mounted upon one end of a rock shaft 58, the latter being journaled in bearings 59, secured to the frame 46. This rock shaft is provided with a laterally extending arm 60, which has connected thereto one end of a cable 61, the opposite end of the said cable being connected to the frame 15 of the shocking trough, as indicated at 62.

In the operation of the shocker, after the stalks have been bound together by the temporary binder, they are secured by a suitable permanent binder and the shocking trough is rotated through an angle of approximately 45 degrees, so as to bring the lower end of the shocking trough to one side of the platform 10. The dumping platform is then manually raised to a vertical position, whereupon a pull will be exerted by the cable 61 to rock the shaft 58 and release the dog 57, so that the shaft 47 will be rotated by the weight of the shock and the temporary binder released and the shock deposited in upright position to one side of the platform.

The invention is susceptible of various changes in its form, proportions and minor details of construction and the right is herein reserved to make such changes as properly fall within the scope of the appended claims.

Having described the invention, what is claimed is:

1. A corn harvester comprising a wheel supported platform, a knife carried thereby, means for guiding the stalk against the knife and directing the same over the platform, a shocking trough mounted for rotation upon the platform, a dumping section included in said trough, a ratchet and pawl controlled winding shaft carried by the dumping section, a flexible binding element adapted to be wound over the shaft to provide a temporary binder for the stalk and a cable having one end connected to the pawl and its opposite end secured to the trough for releasing the shock when the dumping section is raised to an operative position.

2. The combination with a corn harvesting machine having a shocking trough including a separate section capable of movement to a dumping position, of a temporary binder including a ratchet controlled rotatable shaft carried by the dumping section of the trough for holding the shock prior to the application of the permanent binder and a flexible connection between the trough and ratchet for releasing the temporary binder when the trough is moved to a dumping position.

3. The combination with a corn harvesting machine having a shocking trough including a section capable of movement to a dumping position, of a temporary binder including a ratchet controlled rotatable shaft carried by the dumping section of the trough for holding the shock prior to the application of the permanent binder and a flexible element connecting the ratchet and trough for releasing the temporary binder when the trough is moved to a dumping position.

In testimony whereof I affix my signature.

JOHN E. REECE.

Copies of this patent may be obtained for five cents each, by addressing the "Commissioner of Patents, Washington, D. C."